(12) United States Patent
Hollinger et al.

(10) Patent No.: US 6,615,701 B2
(45) Date of Patent: Sep. 9, 2003

(54) BEVEL STOP FOR CUTTING DEVICE

(75) Inventors: David N. Hollinger, Glenshaw, PA (US); Stephen O. Sutton, Erie, PA (US); Ronald E. Young, Wampum, PA (US)

(73) Assignee: Delta International Machinery Corp., Jackson, TN (US)

( * ) Notice: Subject to any disclaimer, the term of this patent is extended or adjusted under 35 U.S.C. 154(b) by 0 days.

(21) Appl. No.: 09/920,555

(22) Filed: Aug. 1, 2001

(65) Prior Publication Data
US 2003/0024366 A1 Feb. 6, 2003

(51) Int. Cl.$^7$ ............................................... B23D 45/14
(52) U.S. Cl. ........................................... 83/473; 83/490
(58) Field of Search ........................ 83/490, 473, 471.3

(56) References Cited

U.S. PATENT DOCUMENTS

| | | |
|---|---|---|
| 4,531,441 A | 7/1985 | Bergler |
| 4,638,700 A | 1/1987 | Fushiya et al. |
| 4,934,233 A | 6/1990 | Brundage et al. |
| 5,216,964 A | 6/1993 | Sato et al. |
| 5,357,834 A | 10/1994 | Ito et al. |
| 5,392,678 A | 2/1995 | Sasaki et al. |
| 5,425,294 A | 6/1995 | Ushiwata et al. |
| 5,437,214 A | 8/1995 | Sasaki et al. |
| 5,524,516 A | 6/1996 | Sasaki et al. |
| 5,564,323 A | 10/1996 | Sasaki et al. |
| 5,582,089 A | 12/1996 | Sasaki et al. |
| 5,623,860 A | 4/1997 | Schoene et al. |
| 5,660,094 A | 8/1997 | Sasaki et al. |
| 5,802,943 A | 9/1998 | Brunson et al. |
| 5,819,625 A | 10/1998 | Sberveglieri |
| 5,829,333 A | 11/1998 | Itzov |
| 5,839,339 A | 11/1998 | Sasaki et al. |
| 5,862,732 A | 1/1999 | Itzov |
| 5,862,734 A | 1/1999 | Brunson et al. |
| 5,865,079 A | 2/1999 | Itzov |
| 5,870,938 A | 2/1999 | Brunson et al. |
| 5,907,987 A | 6/1999 | Stumpf et al. |
| 6,016,732 A | 1/2000 | Brault et al. |
| 6,032,563 A | 3/2000 | Stumpf et al. |
| 6,035,754 A | 3/2000 | Stumpf et al. |
| 6,067,885 A | 5/2000 | Brunson et al. |
| 6,101,914 A | 8/2000 | Brunson et al. |
| 6,142,051 A | 11/2000 | Garuglieri |

Primary Examiner—Paul T. Sewell
Assistant Examiner—Nini F. Legesse
(74) Attorney, Agent, or Firm—Kirkpatrick & Lockhart LLP

(57) ABSTRACT

A cutting device, such as a beveling miter saw, includes a base, a work table supported on the base, and a cutting unit operably connected to the base. The work table includes a workpiece support surface and a stop portion. The cutting unit is selectively rotatable about a first axis between leftward and rightward bevel positions relative to the workpiece support surface. A rotatable stop member is coupled to the cutting unit and is selectively rotatable relative to the cutting unit to selectively contact the stop portion to thereby prevent rotation of the cutting unit in one direction about the first axis. The rotatable stop member and the stop portion may be positioned so that those elements contact when the cutting unit is at a predetermined bevel position, such as a vertical (0°) bevel position, relative to the workpiece support surface.

23 Claims, 8 Drawing Sheets

BEVEL STOP FOR CUTTING DEVICE

BACKGROUND OF THE INVENTION

1. Field of the Invention

The present invention relates to a power-operated cutting device including a movable cutting unit. The present invention more particularly relates to power-operated cutting device including a mechanism for selectively positioning a cutting unit of the device at a predetermined position relative to a workpiece support of the device. The present invention finds application in various cutting devices including, for example power-operated miter saws, scroll saws, and drill presses.

2. Description of the Invention Background

Power-operated cutting devices such as, for example, miter saws and scroll saws, commonly include a work table or other work piece support structure and a cutting unit having a driven cutting element. In the case of a miter saw, for example, the cutting unit is a motor-driven circular saw blade. The cutting unit is movably mounted to the saw's work table by an attachment assembly and may be pivoted downward toward the work table in an arc substantially within a vertical plane. In this way, a work piece positioned on the work table in the path of the pivoting saw blade may be cut at a substantially right angle relative to the workpiece support surface of the work table. A miter angle of the cutting unit may be adjusted by rotating the work table and the cutting unit about an axis that is substantially orthogonal to the work piece support surface. In this way, the position of the cutting unit and the orientation of the circular saw blade is changed relative to a workpiece fence against which the workpiece is supported.

One specialized type of miter saw is a dual bevel miter saw, which is a miter saw including a cutting unit that may be inclined to both leftward and rightward bevel angles relative to a vertical position of the cutting unit. The vertical position of the cutting unit is also referred to herein as the "0° bevel position" because when in that position the cutting unit is inclined neither leftward nor rightward relative to the workpiece support surface of the work table. Dual bevel miter saws typically allow the cutting unit to be inclined to bevel angles up to forty-five degrees in both the leftward and rightward directions. A bevel position locking mechanism is commonly provided on such devices. Once the cutting unit has been adjusted to the desired rightward or leftward bevel position, the locking mechanism is engaged to secure the cutting unit in place prior to executing the cut.

The vertical cutting unit position (0° bevel position) is particularly important because it is the position at which the plane of the circular saw blade is substantially perpendicular to the workpiece support surface. A dual bevel miter saw would be cumbersome and time-consuming to operate absent an easily engageable mechanism to reliably locate and secure the cutting unit at the vertical position. For example, locating the vertical may require using a square to accurately position the plane of the circular saw blade. Also, if a cut to be made at the 0° bevel position is accidentally made with a slight leftward or rightward bevel, it may be necessary to scrap the workpiece.

Thus, to better maximize operator efficiency in situations where the bevel position of a miter saw must be adjusted frequently between vertical and non-vertical positions, it is desirable to provide a mechanism to quickly and accurately position the cutting unit at the vertical position. Preferably, such mechanism is relatively simple to operate, is uncomplicated to manufacture, and does not require narrow manufacturing tolerances, thereby reducing manufacturing cost and, ultimately, consumer cost.

Several mechanisms are known for consistently and accurately positioning the cutting unit of a bevel miter saw at commonly used bevel positions, such as 0° and 45° bevel positions. However, few of these mechanisms meet each of the objectives described above. One such mechanism is described in U.S. Pat. No. 5,437,214. The '214 patent discloses a mechanism for locating various bevel positions using movable stop members that may abut fixed stop members at various positions. The fixed stop members are located in a circumferential direction. This particular design requires numerous components and tight manufacturing tolerances, which would increase manufacturing and consumer costs.

Accordingly, a need exists for an improved mechanism for quickly and reliably locating the cutting unit of a dual bevel miter saw or other cutting device at a predetermined bevel position, such as a vertical position (0° bevel angle). It is desirable that such mechanism is uncomplicated to operate, requires few parts to manufacture, and does not require narrow manufacturing tolerances.

SUMMARY OF THE INVENTION

In order to address the above-described need, the following invention provides a cutting device including an improved bevel stop. The cutting device may be, for example, a single or dual bevel miter saw, a scroll saw, or a drill press. The cutting device includes a base, a work table supported on the base, and a cutting unit operably connected to the work table. The work table includes a workpiece support surface, and a stop portion is mounted either directly or indirectly on the work table. A cutting unit is operably connected to the work table and is selectively rotatable about a first axis between leftward and rightward bevel positions relative to the workpiece support surface. The device also includes a rotatable stop member that is coupled to the cutting unit and travels with it as the cutting unit assumes its various positions relative to the workpiece support surface. The stop member is selectively rotatable relative to the cutting unit to selectively contact the stop portion. Preferably, the rotatable stop member is selectively rotatable relative to the cutting unit about a second axis that is substantially transverse to the first axis. Contact between the rotatable stop member and the stop portion limits rotation of the cutting unit about the first axis.

The present invention is further directed to a power-operated saw including an improved bevel stop. The power-operated saw includes a work table that is supported on the base, and a cutting unit that is pivotally coupled to the work table and selectively rotates about a first axis between leftward and rightward bevel positions relative to the workpiece support surface. A rotatable stop member is coupled to the cutting unit, and a stop portion is directly or indirectly mounted on the work table. The rotatable stop member is rotatable relative to the cutting unit about a second axis and may rotate between a first position and a second position. The stop portion prevents the cutting unit from rotating in one direction about the first axis when the rotatable stop member is in the first position. When the rotatable stop member is in the second, it is incapable of abutting the stop portion as the cutting unit rotates about the first axis.

Preferably, the stop portion is an adjustable stop member that is adjustable in position relative to the workpiece support surface. When the adjustable stop member is in a predetermined position relative to said workpiece support surface and the rotatable stop member abuts the adjustable stop member, the cutting unit is in a predetermined bevel position relative to the workpiece support surface. The predetermined position may be, for example, a vertical, 0° bevel position.

Thus, the feature of the present invention providing selective abutment between a rotatable member mounted to the cutting unit and stop portion of the work table allows an operator to quickly, accurately, and repeatedly locate the cutting unit at a predetermined bevel position relative to the workpiece support surface. The present invention also preferably includes a bevel locking mechanism. Once the cutting unit is positioned at the predetermined bevel position, the cutting unit may be locked in position using the bevel locking mechanism. In addition to the foregoing advantages, embodiments of the present invention may include only a few parts and may be designed so as not to require close tolerances during manufacture.

Other features, objects and advantages of the present invention will become apparent from the following description of certain embodiments of the present invention.

BRIEF DESCRIPTION OF THE DRAWINGS

The present invention may be understood by reference to the following figures showing an embodiment of the invention, wherein like reference numbers refer to like elements.

DETAILED DESCRIPTION OF EMBODIMENTS OF THE INVENTION

Figure 1:
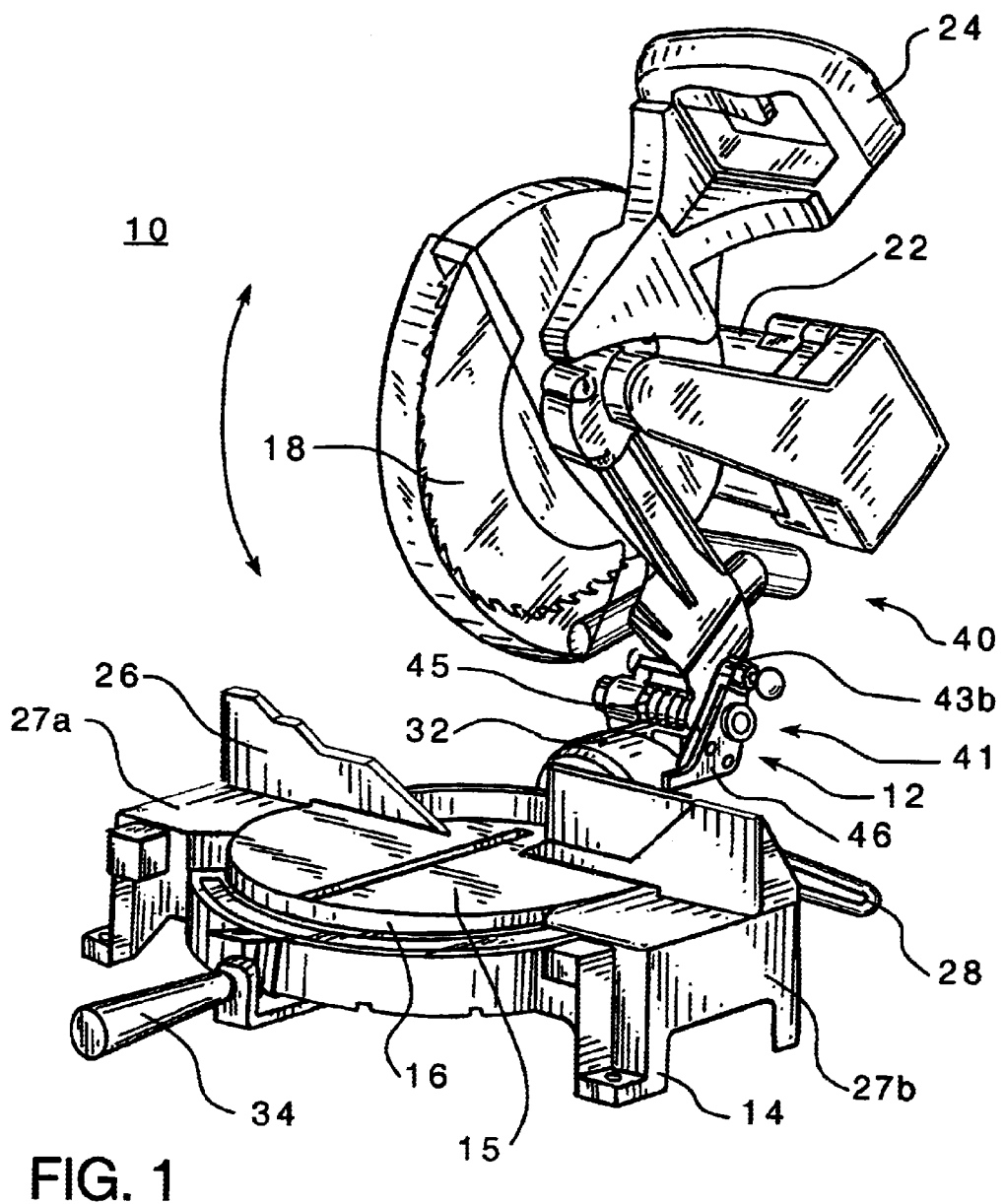
FIG. 1 is a front perspective view of an embodiment of a dual bevel miter saw constructed according to the present invention, with the cutting unit at a vertical (i.e., 0° bevel) position, and including an embodiment of a bevel stop of the present invention.
Figure 2:
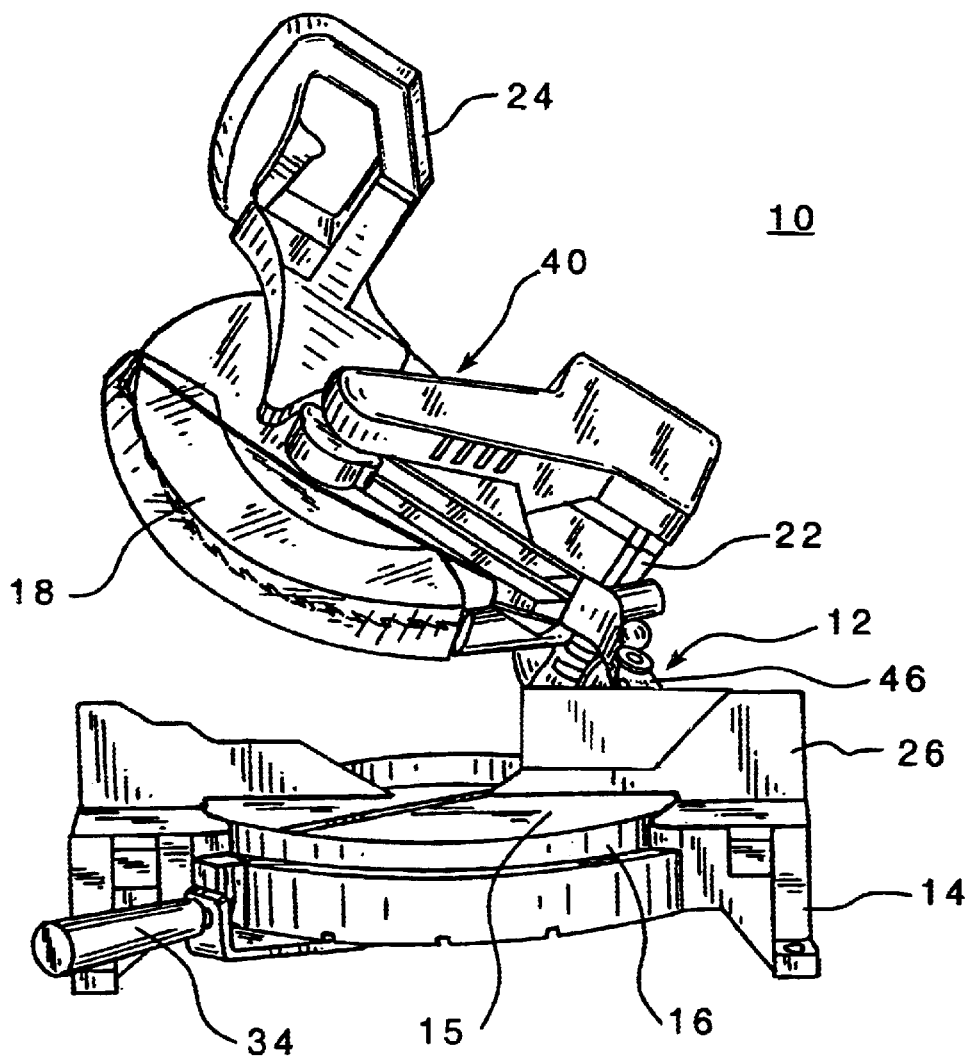
FIG. 2 is a front elevational view of the dual bevel miter saw of FIG. 1, with the work table shown rotated leftward to a provide miter angle, and with the cutting unit pivoted to a leftward bevel position.
Figure 3:
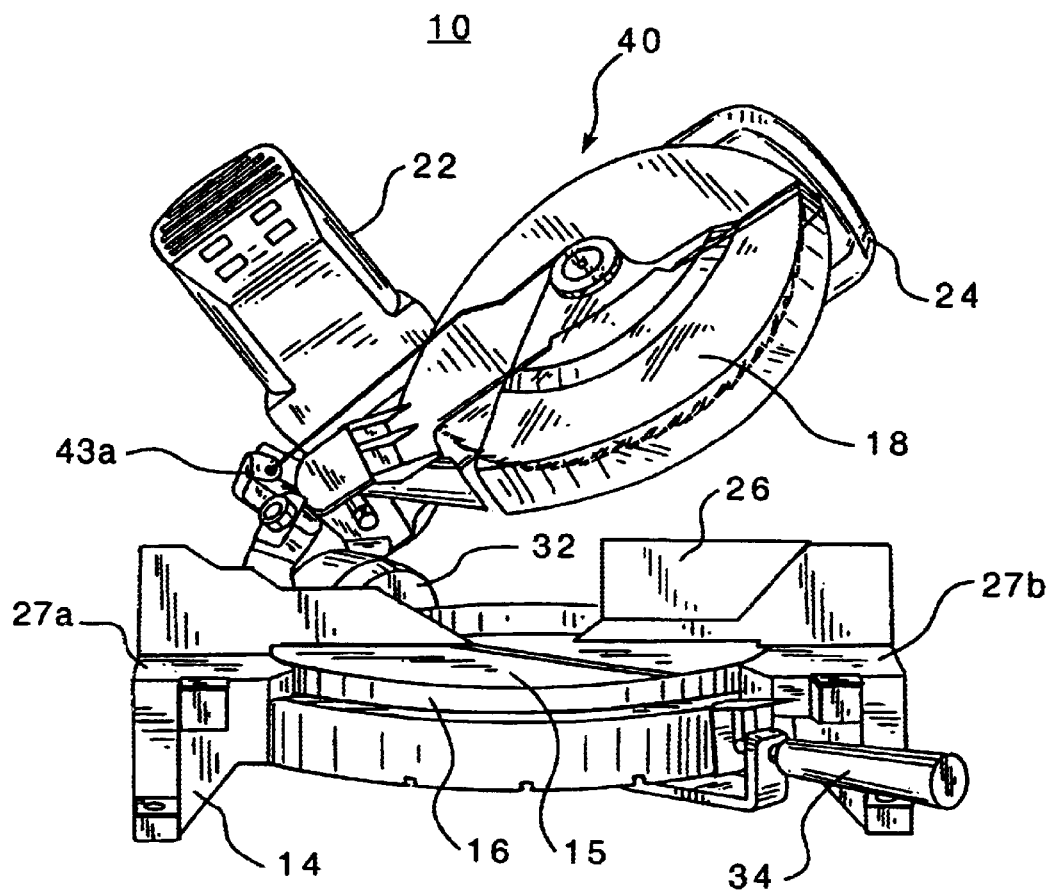
FIG. 3 is a front elevational view of the dual bevel miter saw of FIG. 1, with the work table rotated rightward to provide a miter angle, and with the cutting unit pivoted to a rightward bevel position.

Referring now to the accompanying figures for the purpose of illustrating the invention and not for the purpose of limiting the same, there is shown in FIGS. 1 through 3 a dual bevel miter saw 10 that incorporates an embodiment of a bevel stop mechanism generally indicated as 12 constructed according to the present invention. The miter saw 10 includes a base 14 that supports a work table 16. The work table 16 includes a workpiece support surface 15 on which a workpiece may be supported during cutting operations. A fence 26 is mounted on side portion 27a and 27b of base 14. The fence 26 is adapted to further support a workpiece disposed on the workpiece support surface 15.

A cutting unit 40 is operably connected to the work table 16 in the manner described below. The work table 16 is rotatably mounted within the base 14 about a generally vertical axis (when the miter saw 10 is disposed on a generally horizontal surface) to permit adjustment of the miter angle of the cutting unit 40. The miter angle may be adjusted by rotating the work table 16 relative to the base so as to adjust the angle of a cutting member 18, mounted on the cutting unit 40, relative to the fence 26. The cutting member 18 of the miter saw 10 is a circular saw blade. The miter angle of the cutting member 18 may be secured by manipulating a miter locking mechanism 34, which locks the work table 16 from rotating relative to the base 14.

A mounting assembly 41 operably connects the cutting unit 40 to the work table 16. The mounting assembly 41 allows the cutting unit 40 to move through two degrees of freedom relative to the work support surface 15. First, the mounting assembly 41 allows the cutting unit 40 to pivot toward and away from the workpiece support surface 15, such as in the direction of the arrow in FIG. 1. Second, the mounting assembly 41 allows the cutting unit 40 to pivot relative to the workpiece support surface 15 and assume various rightward and leftward bevel positions as described below.

As used herein, rightward and leftward positions or directions are judged from the perspective of an operator standing in a typical operating position. For reference, FIG. 2 shows a leftward bevel position and FIG. 3 shows a rightward bevel position. FIGS. 2 and 3 also illustrate the miter saw 10 configured at left and right miter angles, respectively.

Again referring to FIG. 1, the miter saw 10 also includes an extendable support member 28 mounted within the base 14 and which may be extended to provide additional support for the miter saw 10. A motor 22 selectively drives the cutting element 18, and a handle 24 is provided on the cutting unit 40 for pivoting the cutting unit 40 downward in the direction of the curved arrow in FIG. 1 for executing a cut.

Figure 8:
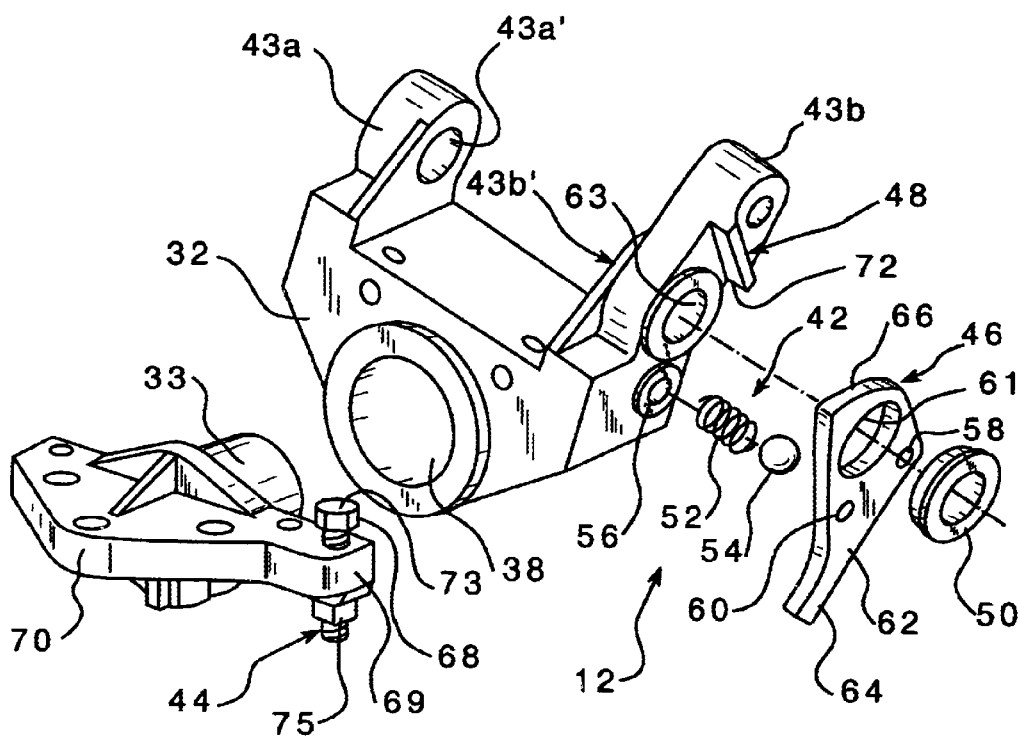
FIG. 8 is an assembly view showing the trunnion mount, bevel trunnion, and elements of the bevel stop embodiment of the dual bevel miter saw shown in FIG. 1

The mounting assembly 41 includes, among other elements, bevel trunnion 32 and trunnion mount 70, which are shown in isolation in FIG. 8. The cutting unit 40 is rotatably connected to bevel trunnion 32 between trunnion legs 43a and 43b. An axis defined between the center points of the cutting unit mounting bores 43a' and 43b' defines the axis of rotation of the cutting unit 40 relative to the bevel trunnion 32. The cutting unit 40 pivots toward and away from workpiece support surface 15 by rotating relative to bevel trunnion 32 at the axis of rotation defined between the bores 43a' and 43b'. A spring 45, shown in FIG. 1, biases the cutting unit 40 to pivot upward relative to the bevel trunnion 32 and the workpiece support surface 15.

The bevel trunnion 32 is rotatably attached to trunnion mount 70, and the trunnion mount is fixedly connected to the work table 16. Referring again to FIG. 8, it will be understood that a rotatable connection between the bevel trunnion 32 and the trunnion mount 70 is provided by disposing tapered member 33 of the trunnion mount 70 within cylindrical bore 38 of the bevel trunnion 32. In that way, the tapered member 33 defines an axis of rotation, also referred to herein as a pivot axis, for rotation of the cutting unit 40 relative to the workpiece support surface 15.

Bevel trunnion 32 is rotatably attached to trunnion mount 70, which in turn is fixedly connected to the work table 16. Once a desired bevel angle is achieved by rotating the bevel trunnion 32 relative to the trunnion mount 70, the bevel angle may be fixed by rotating a bevel locking handle 36 (as shown in FIGS. 4 through 7) which secures the bevel trunnion against rotation relative to the trunnion mount 70.

Referring to FIGS. 4 through 8, a bevel stop, generally designated as 12, is provided on a side of the bevel trunnion 32. As best shown in FIG. 8, the bevel stop 12 includes a rotatable stop member 46. The bevel trunnion includes a stop portion in the form of an adjustable stop member 44. The adjustable stop member 46 may be directly or, as in the present embodiment, indirectly mounted to the work table 16. In addition, a stop surface 48 of the bevel trunnion 32, a retaining member 50, and a spring detent mechanism generally designated as 42 are provided. The rotatable stop member 46 includes a plate member 62 having a lobe 64, an abutment surface 66, a first detent bore 58, a second detent bore 60, and an attachment bore 61. The rotatable stop member 46 is rotatably coupled to the trunnion leg 43*b* by securing retaining member through the attachment bore 61 and into a bore 63 of the leg 43*b*. It will be understood from FIG. 8 that the axis of rotation of the rotatable stop member 46 on the bevel trunnion 32 is substantially transverse to the axis of rotation of the cutting unit 40 relative to the bevel trunnion 32.

The spring detent mechanism 42 of the bevel stop 12 includes a biasing spring 52 and a ball 54, as shown in FIG. 8. Biasing spring 52 and ball 54 are inserted into an aperture 56 in the bevel trunnion 32 and are retained in the aperture 56 by the rotatable stop member 46, which covers the aperture 56 when the rotatable stop member 46 is mounted to the leg 43*b*. The adjustable stop member 44 includes a threaded bolt 68 that is threadably mounted in a threaded bore disposed through a lobe 69 of the trunnion mount 70, as is shown in FIGS. 4 through 8. An elevation of the head surface 73 of the bolt 68 relative to the lobe 69 may be adjusted by threadedly advancing or retracting bolt 68. A nut 75 is provided on an exposed end of the bolt 68 to allow the bolt 68 to be locked against further rotation once a desired elevation of the head surface 73 is provided.

Figure 4:
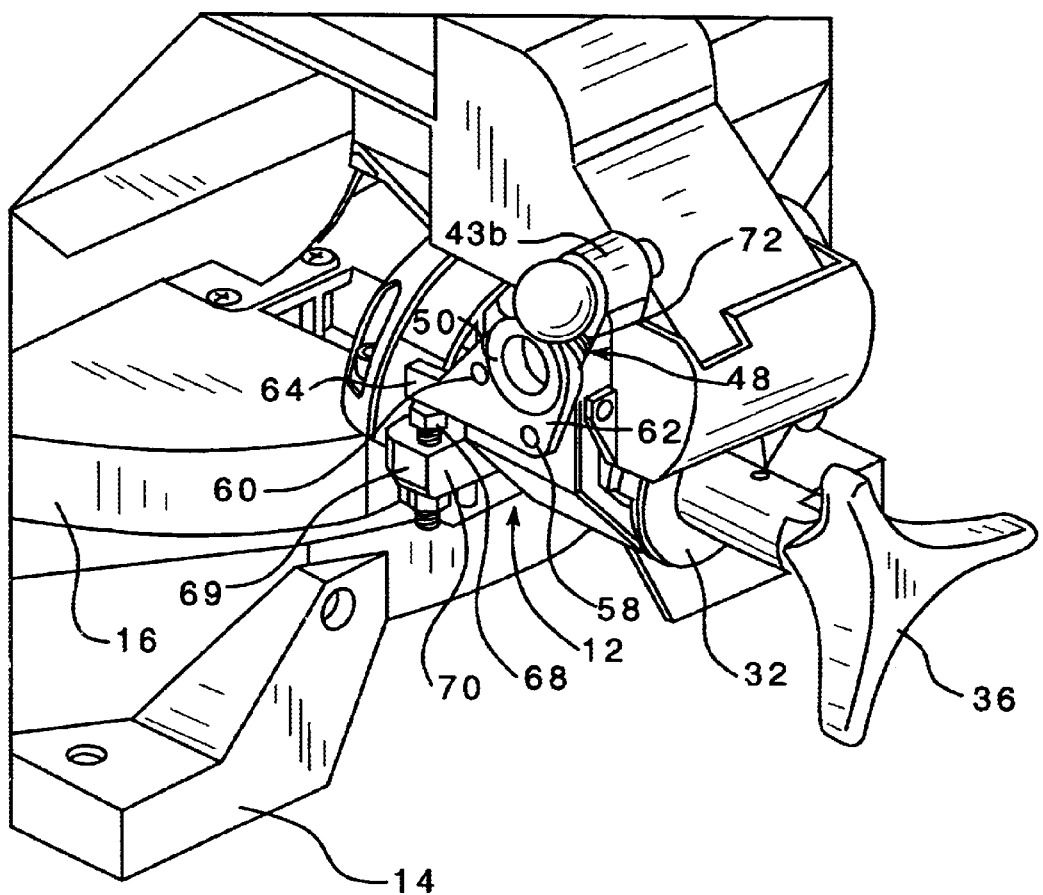
FIG. 4 is a rear perspective view of a region of the dual bevel miter saw of FIG. 1 showing the bevel stop embodiment in a first position.
Figure 5:
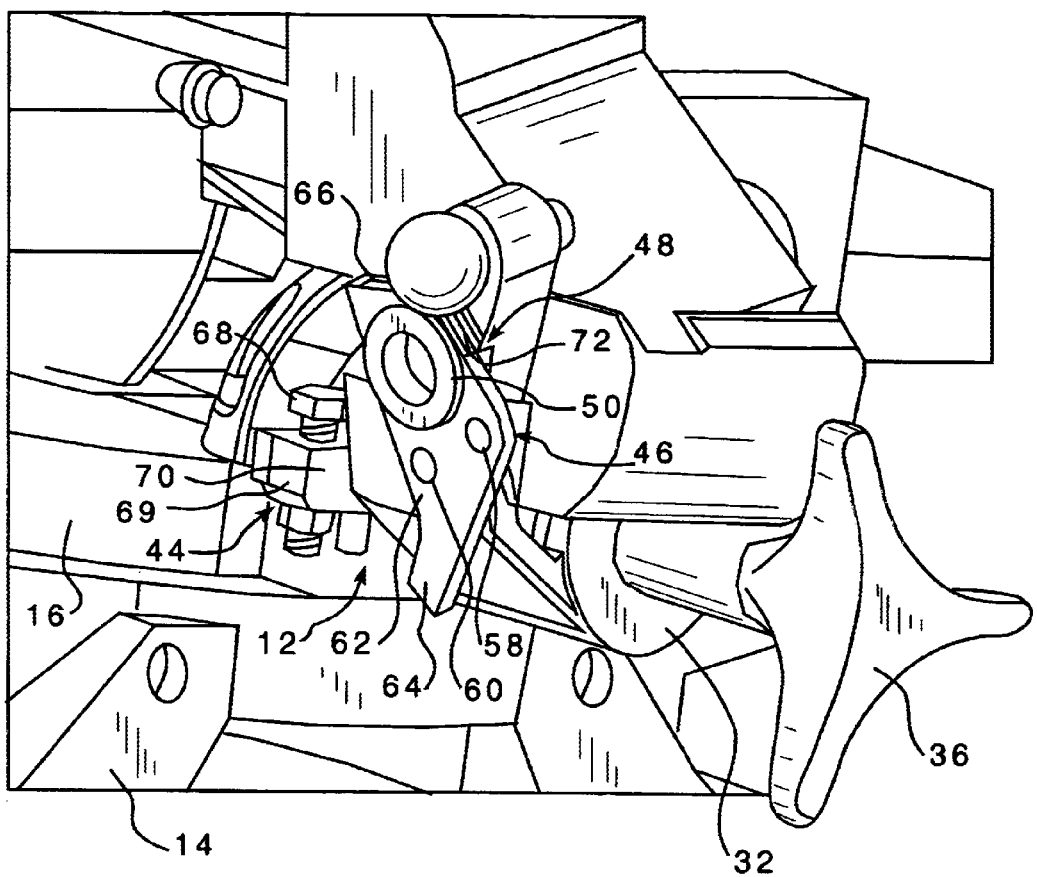
FIG. 5 is a rear perspective view of a region of the dual bevel miter saw of FIG. 1 showing the bevel stop embodiment in a second position, and with the cutting unit in a vertical position.
Figure 6:
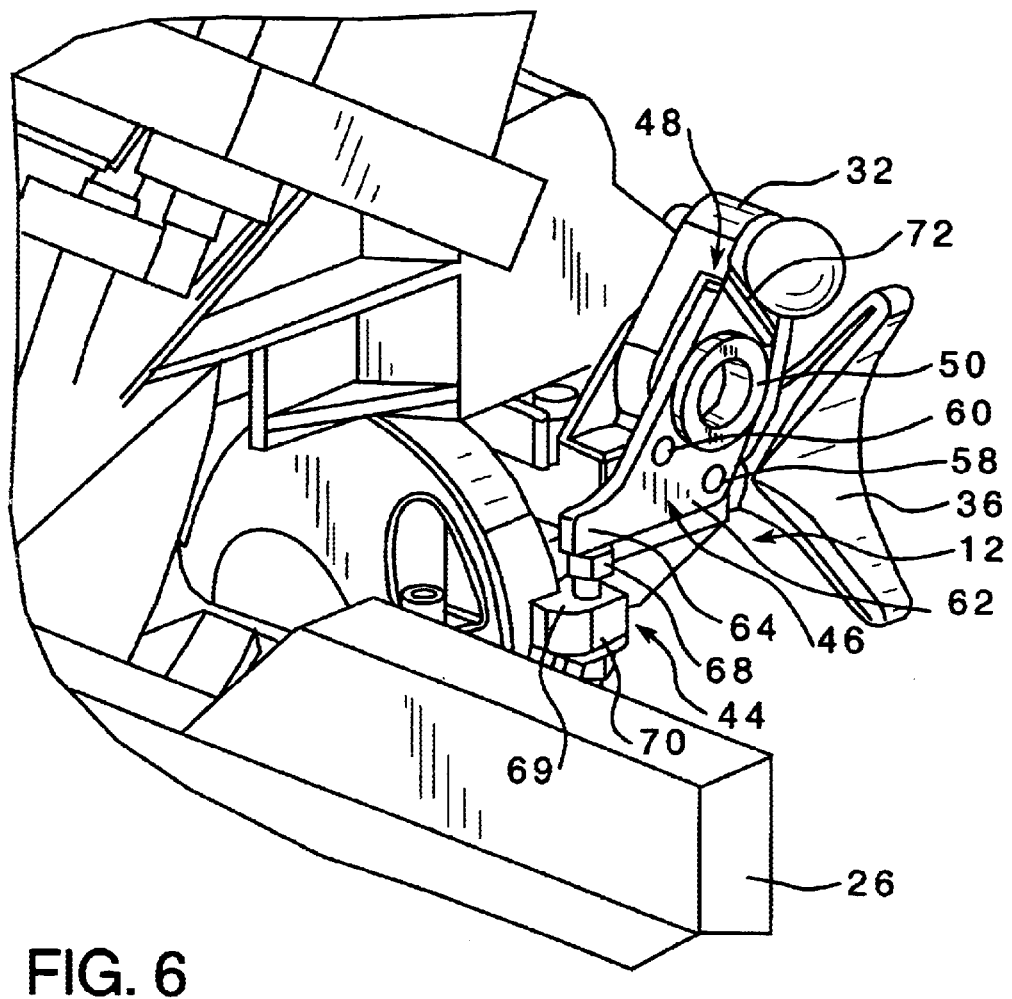
FIG. 6 is a front perspective view of a region of the dual bevel miter saw of FIG. 1 showing the bevel stop embodiment in the first position, and with the cutting unit in a vertical position.
Figure 7:
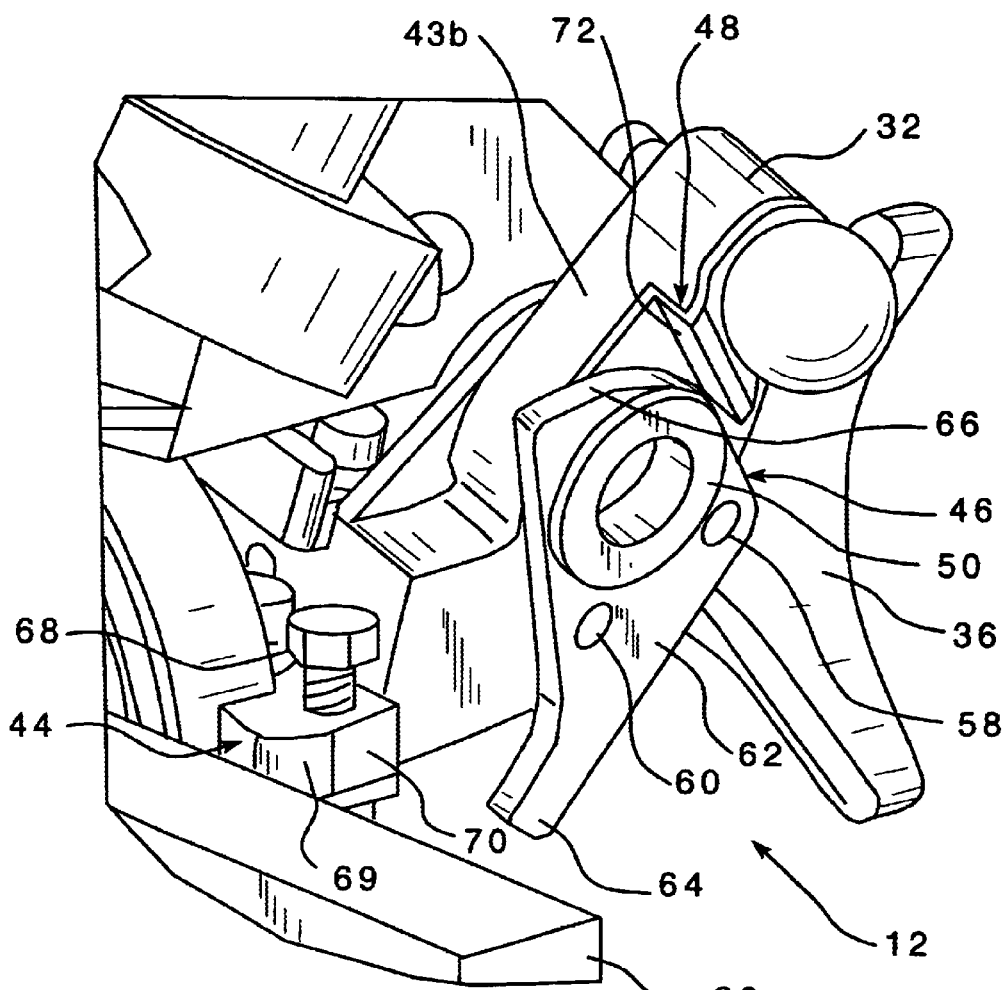
FIG. 7 is a front perspective view of a region of the dual bevel miter saw of FIG. 1, with the bevel stop embodiment in the second position, and with the cutting unit pivoted to a rightward bevel angle.

The first detent bore 58 of the rotatable stop member 46 is positioned so that the ball 54, which is biased by the spring 54 to contact the rotatable stop member 46, will partially seat within the first detent bore 58 when the rotatable stop member 46 is in a first position. Seating the ball 54 within the first bore 58 inhibits further rotation of the rotatable stop member 46. When the rotatable stop member 46 is in the first position, the lobe 64 of the rotatable stop member 46 may come into contact with the head surface 73 of the adjustable stop member 44 as the bevel trunnion 32 rotates relative to the trunnion mount 70. FIGS. 1, 4, and 6 show the rotatable stop member 46 in the first position, and FIGS. 4 and 6 also show the lobe 64 of the rotatable stop member 46 in contact with the head surface 73 of the bolt 68.

The second detent bore 60 of the rotatable stop member 46 is positioned so that the ball 54 will partially seat within the second detent bore 60 when the rotatable stop member is in a second position. Similar to the first position, the seating of the ball 54 within second detent bore 60 inhibits rotation of the rotatable stop member 46. The rotatable stop member is shown in the second position in FIGS. 5 and 7.

Referring again to FIGS. 1, 4, and 6, the rotatable stop member 46 is rotated in a clockwise direction from the second position to assume the first position. In order to allow the rotatable stop member 46 to clear the adjustable stop member 44 and allow the cutting unit 40 to bevel rightward from the position shown in FIGS. 1, 4, and 6, the cutting unit 40 is first pivoted leftward by rotating the bevel trunnion 32 within the trunnion mount 70. Once the cutting unit 40 has been pivoted leftward, the rotatable stop member 46 is rotated into the second position (as it may now clear the bolt head 73). When the rotatable stop member is in the second position, the adjustable stop member 44 will not prevent the cutting unit 18 from beveling to any leftward or rightward bevel position.

The lobe 64 of the rotatable stop member 46 contacts the adjustable stop member 44 when the rotatable stop member 46 is in the first position and the cutting unit 40 is pivoted from a leftward bevel position in the rightward direction toward the vertical position (0° bevel position). When the lobe 64 contacts the adjustable stop member 44 as the cutting unit is pivoted in the rightward direction toward the vertical position, the rotatable stop member 46 is urged to further rotate in the clockwise direction from the first position. This rotation is resisted as follows. When the rotatable stop member 46 is in the first position, the abutment surface 66 of the rotatable stop member 46 opposes the abutment ledge 72 of the leg 43*b* of the bevel trunnion 32. As will be evident from, for example, FIG. 6, the opposed relationship of the abutment surface 66 and the abutment ledge 72 prevents the rotatable stop member from further rotating in the clockwise direction from the first position. Thus, the rotatable stop member 46 cannot be forced to further rotate in the clockwise direction from the first position if the lobe 64 of the rotatable stop member 46 forcibly contacts the head surface 73 of the bolt 68. Therefore, for example, if the abutment of the lobe 64 and the head surface 73 is selected so that the cutting unit 40 is in a substantially vertical position (substantially 0° bevel position), this position is reliably maintained despite attempts to bevel the cutting unit 40 to a rightward bevel. Engaging the bevel locking mechanism 36 prevents movement of the cutting unit 40 from the substantially vertical position to a leftward bevel position.

Thus, the cutting unit 40 may be easily, reliably, and repeatedly positioned in a predetermined bevel position at which contact occurs between the head surface 73 and the lobe 64 of the rotatable stop member 46. That predetermined position may be a substantially vertical position of the cutting unit 40, but also may be any other bevel position by appropriately positioning and configuring the adjustable and rotatable stop members 44 and 46. The bevel stop mechanism 12 includes few parts, and because of the adjustability of the adjustable stop member, narrow manufacturing tolerances are unnecessary. Also, although the rotatable stop member 46 of the bevel stop 12 is shown to include two detent positions, the first position and the second position, it will be understood that additional detent positions of the rotatable stop member 46 may be provided for by suitably modifying the disclosed design.

From the substantially vertical position of the cutting unit 40 shown in FIG. 6, the rotatable stop member may be rotated counterclockwise into the second position by first rotating the bevel trunnion 32 relative to the trunnion mount 70 so that the cutting unit 40 moves in the leftward bevel direction, such as shown in FIG. 2. The rotatable stop member 46 is then rotated to the second position. The cutting unit 40 may then be pivoted to rightward bevel positions because the rotatable stop member 46 clears the bolt 68 when the rotatable stop member 46 is in the second position.

It will be understood that the adjustability of the elevation of the bolt 68, which is provided by its threaded attachment to the lobe 69 of the trunnion mount 70, allows the operator, within some range, to accurately set and adjust the bevel position at which the cutting unit 40 is positioned when the lobe 64 contacts the head surface 73.

Whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the invention as described in the appended claims. In addition, although the present invention has been shown in connection with a power-operated dual bevel miter saw, it will be understood that the bevel stop of the present invention may be adapted for use with other cutting devices including a cutting unit that may be adapted to selectively assume bevel positions relative to a workpiece support structure of the devices. Such other cutting devices may include, for example, scroll saws and drill presses. Those of ordinary skill in the art, after having considered the present description of the invention, may readily adapt the bevel stop embodiment described herein for use with such other cutting devices.

What is claimed is:

1. A cutting device comprising:
   a base;
   a work table supported on said base, said work table including a workpiece support surface;
   a stop portion that is one of directly and indirectly mounted on said work table;
   a cutting unit operably connected to said work table and selectively rotatable about a first axis between leftward and rightward bevel positions relative to said workpiece support surface; and
   a rotatable stop member coupled to and traveling with said cutting unit, said stop member selectively rotatable relative to said cutting unit and selectively contacting said stop portion to limit rotation of said cutting unit about said first axis.

2. The cutting device of claim 1, wherein said rotatable stop member is selectively rotatable relative to said cutting unit about a second axis substantially transverse to said first axis.

3. The cutting device of claim 2, wherein said rotatable stop member is rotatable about said second axis between a first position, wherein said cutting unit is prevented from rotating about said first axis in one of a leftward or rightward direction when said cutting unit is positioned at a predetermined bevel position about said first axis relative to said workpiece support surface, and a second position, wherein said cutting unit is permitted full rotation about said first axis between said leftward and rightward bevel positions.

4. The device of claim 3, further comprising a detent mechanism selectively retaining said rotatable stop member in a selected one of said first position and said second position.

5. The device of claim 4, wherein said rotatable stop member includes a first recess and a second recess, said detent mechanism engaging said first recess to retain said rotatable stop member in said first position, said detent mechanism engaging said second recess to retain said rotatable stop member in said second position.

6. The device of claim 3, wherein said stop portion is an adjustable stop member that is adjustable in elevation relative to said workpiece support surface, and wherein said cutting unit is in a substantially vertical position relative to said workpiece support surface when said adjustable stop member is in a predetermined position relative to said workpiece support surface and said rotatable stop member abuts said adjustable stop member.

7. The device of claim 3, wherein said stop portion is an adjustable stop member that is adjustable in elevation relative to said workpiece support surface, and wherein said cutting unit is in a substantially vertical position relative to said workpiece support surface when said adjustable stop member is in a predetermined position relative to said workpiece support surface and said rotatable stop member abuts said adjustable stop member.

8. The cutting device of claim 1, wherein said cutting device is one of a miter saw, a scroll saw, and a drill press.

9. The cutting device of claim 1, wherein said cutting device is a dual bevel miter saw.

10. The cutting device of claim 1, wherein said cutting unit includes a driven cutting element.

11. The cutting device of claim 10, wherein said cutting element is a circular saw blade.

12. The cutting device of claim 11, further comprising a motor selectively driving said circular saw blade to rotate.

13. The device of claim 1, further comprising a mounting member connected to said work table and including a threaded bore, and wherein said adjustable stop member is a threaded bolt threadedly disposed within said threaded bore, a position of said threaded bolt relative to said workpiece support surface being adjustable by rotating said threaded bolt within said threaded bore.

14. The device of claim 1, further comprising a locking mechanism selectively securing said cutting unit at a predetermined bevel position about said first axis.

15. The device of claim 1, wherein said rotatable stop member includes a lobe that selectively contacts said stop portion.

16. A power-operated saw comprising:
   a base;
   a work table supported on said base and having a stop portion that is one of directly and indirectly mounted thereon;
   a cutting unit pivotally coupled to said work table and selectively rotatable about a first axis between leftward and rightward bevel positions, said cutting unit including a driven circular saw blade; and
   a rotatable stop member coupled to and traveling with said cutting unit, said rotatable stop member rotatable relative to said cutting unit about a second axis between a first position and a second position, said stop portion preventing rotation of said cutting unit about said first axis in one direction when said rotatable stop member is in said first position, said rotatable stop member incapable of abutting said stop portion as said cutting unit rotates about said first axis when said rotatable stop member is in said second position.

17. The power-operated saw of claim 16, wherein said stop portion is an adjustable stop member having a portion that is adjustable in position relative to said workpiece support surface, and wherein when said adjustable stop member is in a predetermined position relative to said workpiece support surface and said rotatable stop member abuts said adjustable stop member, said cutting unit is in a substantially vertical position relative to said workpiece support surface.

18. The power-operated saw of claim 17, wherein said adjustable stop member is a threaded bolt and said base includes a threaded bore, said threaded bolt received within said threaded bore, a position of said threaded bolt relative to said workpiece support adjustable by rotating said threaded bolt with said threaded bore.

19. The power-operated saw of claim 16, wherein said rotatable stop member rotates about said second axis from said second position to said first position in a first direction, and wherein said rotatable stop member is prevented from further rotation in said first direction when in said first position.

20. The power-operated saw of claim 16, wherein the saw is a dual bevel miter saw.

21. The power-operated saw of claim 16, further comprising a detent mechanism selectively retaining said rotatable stop member in a selected one of said first position and said second position.

22. The power-operated saw of claim 21, wherein said rotatable stop member includes a first recess and a second recess, said detent mechanism engaging said first recess to retain said rotatable stop member in said first position, said detent mechanism engaging said second recess to retain said rotatable stop member in said second position.

23. The power-operated saw of claim 16, further comprising a locking mechanism selectively securing said cutting unit at a predetermined bevel position about said first axis.

* * * * *

UNITED STATES PATENT AND TRADEMARK OFFICE
CERTIFICATE OF CORRECTION

PATENT NO.    : 6,615,701 B2
DATED         : September 9, 2003
INVENTOR(S)   : Hollinger et al.

It is certified that error appears in the above-identified patent and that said Letters Patent is hereby corrected as shown below:

Column 3,
Line 37, delete "a provide" and substitute therefor -- provide a --.
Line 62, after "FIG. 1" insert -- . --.

Column 4,
Line 8, delete "portion" and substitute therefor -- portions --.

Column 5,
Line 16, delete "bevel trunnion" and substitute therefor -- trunnion mount 70 --.
Line 18, delete "member 46" and substitute therefor -- member 44 --.
Line 50, delete "54" and substitute therefor -- 52 --.

Column 9,
Line 7, after "support" insert -- surface --.

Signed and Sealed this

Eighteenth Day of May, 2004

JON W. DUDAS
*Acting Director of the United States Patent and Trademark Office*